(12) United States Patent
Kessen et al.

(10) Patent No.: US 6,481,701 B2
(45) Date of Patent: Nov. 19, 2002

(54) SPRING HAVING COILS OF VARYING DIAMETERS

(75) Inventors: Jeffrey Steven Kessen, Plymouth, MI (US); David John Fanson, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/802,478

(22) Filed: Mar. 9, 2001

(65) Prior Publication Data

US 2002/0125623 A1 Sep. 12, 2002

(51) Int. Cl.[7] .............................. F16F 1/06; F16F 1/08
(52) U.S. Cl. .................... 267/166; 267/166.1; 267/288; 267/180; 267/221
(58) Field of Search .................. 267/221, 180, 267/166.1, 166, 286, 288, 289, 290, 181, 33, 34, 272, 179; 280/124.179, 124.145, 124.146, 124.156

(56) References Cited

U.S. PATENT DOCUMENTS

| | | | | |
|---|---|---|---|---|
| 1,751,261 A | * | 3/1930 | Wilson | |
| 2,576,824 A | * | 11/1951 | Bush | |
| 3,727,902 A | * | 4/1973 | Burckhardt et al. | 267/180 |
| 3,751,025 A | * | 8/1973 | Beery et al. | 267/180 |
| 3,773,346 A | * | 11/1973 | Scheubleih et al. | |
| 4,111,407 A | * | 9/1978 | Stager | 267/166 |
| 4,120,489 A | * | 10/1978 | Borlinghaus | |
| 4,377,280 A | * | 3/1983 | Wienard et al. | 267/180 |
| 4,397,453 A | * | 8/1983 | Seecamp | 267/180 |
| 4,810,231 A | * | 3/1989 | Weissenberger et al. | 267/180 |
| 4,828,237 A | * | 5/1989 | Neff | 267/221 |
| 4,903,985 A | | 2/1990 | Muhr et al. | |
| 5,868,383 A | * | 2/1999 | Codos | 267/166.1 |
| 6,199,882 B1 | * | 3/2001 | Imaizumi et al. | 280/124.179 |
| 6,328,290 B1 | * | 12/2001 | Imaizumi et al. | 267/179 |

FOREIGN PATENT DOCUMENTS

| | | | |
|---|---|---|---|
| FR | 2641741 | * | 7/1990 |
| FR | 2699245 | * | 6/1994 |
| JP | 58149432 | * | 9/1983 |

OTHER PUBLICATIONS

Side Load Springs as a Solution to Minimize Adverse Side Loads Acting on the McPherson Strut, SAE Technical Paper Series, Feb. 28–Mar. 3, 1994, Thomas Wunsche.

* cited by examiner

Primary Examiner—Douglas C. Butler
(74) Attorney, Agent, or Firm—Robert M. Sigler

(57) ABSTRACT

A spring includes intermediate coils of larger and smaller diameter so that upon compression of the spring the smaller diameter coil may nest within one of the large diameter coils, thereby reducing the overall length of the spring without causing the coils to come in contact with one another. The spring may be used in automotive vehicle suspension assemblies and other applications. The axis of the smaller coil may be offset from the axes of the other coils, thereby providing a spring in which one side is softer and the other is stiffer, so that upon compression the spring bows or deflects along a curved line. In addition to the small diameter coil being offset from the remaining coils, the wire diameter of one or more of the coils may be changed to affect the local stiffness of the spring.

11 Claims, 3 Drawing Sheets

SPRING HAVING COILS OF VARYING DIAMETERS

TECHNICAL FIELD

This invention relates to a coil spring having coils of varying diameters, which are particularly useful in vehicle suspension systems.

BACKGROUND OF THE INVENTION

Vehicle suspension systems typically include a suspension damper, which is connected at one end to the vehicle body and at the other end to the lower control arm of the vehicle. A coil suspension spring circumscribes the damper and acts between an upper spring seat which is secured to the body of the vehicle and a lower spring seat which is secured to the damper. Preferably, the axis of the coil spring acts along the line of the reaction force of the vehicle wheel, which extends between the center of the wheel to the vehicle body. Since the lower end of the damper can not be connected to the center of the wheel, undesirable transverse forces are applied against the damper. Furthermore, because of space constraints in modern vehicles, packaging considerations severely limit the size of the damper and spring. Accordingly, it is desirable that the compressed height of the coil spring be as small as possible, without allowing the coils to engage one another. When the coils of a spring engage one another, the spring ceases to be able to absorb road shocks, and the ride quality is significantly deteriorated.

SUMMARY OF THE INVENTION

According to the present invention, a coil spring is provided in which one of the intermediate coils nests within an adjacent coil when the spring is compressed. If the spring has a sufficient number of coils, more than one of the coils may be designed to nest within an adjacent coil. Accordingly, the spring has an overall compressed height (without the intermediate coils contacting one another) that is less than that of a prior art constant diameter spring. Although the spring is useful in vehicle suspension systems, springs that have a reduced compressed height are useful in many other applications.

According to another embodiment of the invention, the axes of adjacent intermediate coils having different diameters are offset from one another. Accordingly, assuming that all of the coils of the spring have the same pitch, the spring will not compress uniformly since the change in diameter of the coils and the offset between the axis of the coils affects the local stiffness of the spring. Accordingly, one side of the spring will be "softer" than the other side of the spring. When the spring is compressed, the spring will bow, or curve. As discussed in U.S. Pat. 4,903,985, the ability of a spring to bow or curve as it is compressed has technical advantages, including the fact that a moment is applied to the lower spring seat opposing the transverse forces applied to the damper, thus improving the operation and durability of the damper and providing better ride characteristics. Furthermore, the pitch of the offset coil may be adjusted to compensate for the effects of the offset axis and smaller diameter. Accordingly, the spring will compress geometrically along substantially straight axes, but due to the offset and smaller diameter of some of the coils of the spring, a moment will still be exerted on the lower spring seat. Since stiffness of the spring is also a function of the cross sectional area of the wire from which the spring is wound, tapered wire may be used to provide a smaller cross section on one side of the spring and a larger cross section on the other side of the spring for at least some of the coils.

DESCRIPTION OF THE PREFERRED EMBODIMENT

Figure 1:
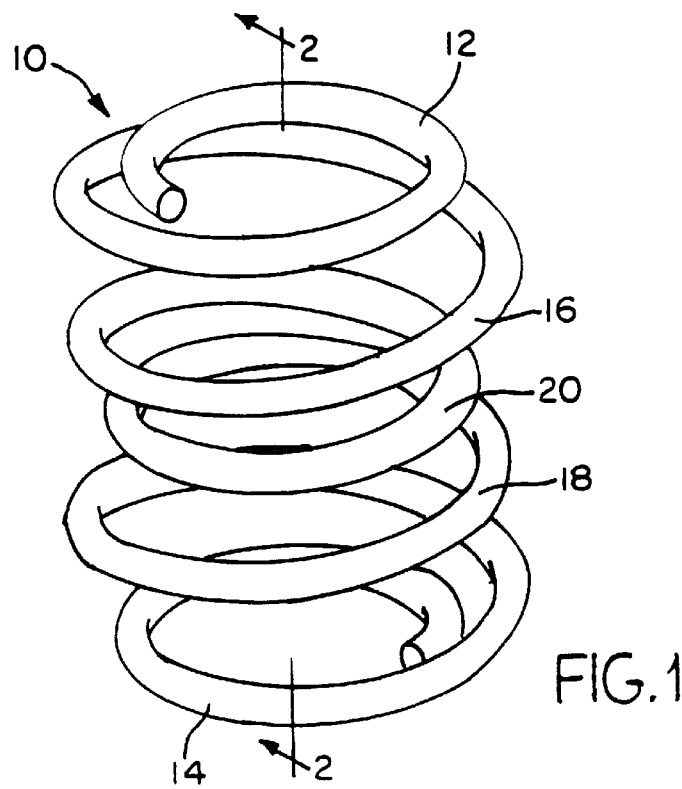
FIG. 1 is a view in perspective of a spring made pursuant to the teachings of the present invention.
Figure 2:
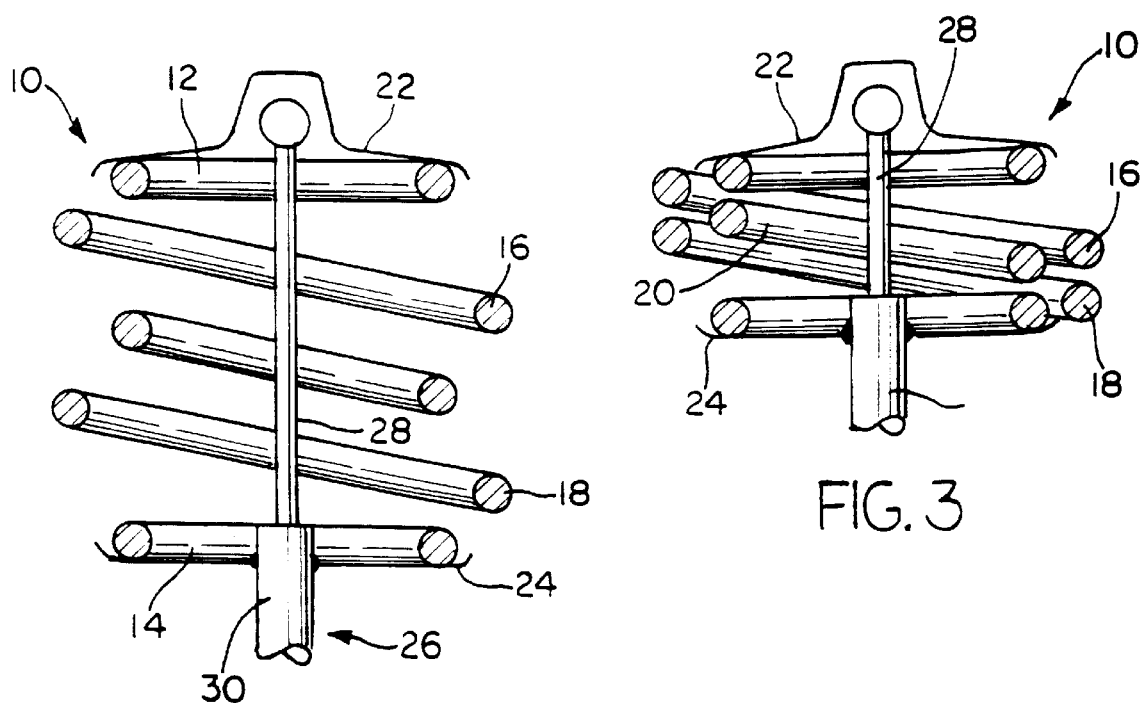
FIG. 2 is a cross-sectional view taken substantially along the lines 2—2 of FIG. 1. but illustrating a spring installed in a suspension system incorporating a spring damper and upper and lower spring seats.
Figure 3:
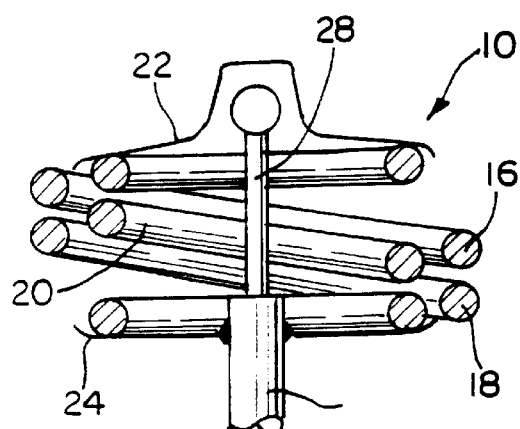
FIG. 3 is a cross-sectional view of the spring used in FIG. 2, but illustrating the spring in its compressed condition.

Referring now to FIGS. 1–3 of the Drawings, a coil suspension spring generally indicated by the numeral 10 includes an upper end coil 12, a lower end coil 14, larger diameter intermediate coils 16, 18 and a smaller diameter intermediate coil 20 disposed between the larger intermediate coils 16 and 18. The spring 10 may be used in a vehicle suspension assembly consisting of an upper spring seat 22 which is mounted on the body of the vehicle, a lower spring seat 24, and a suspension damper generally indicated by the number 26. Suspension damper 26 includes a piston rod 28, which extends from and retracts into the damper housing 30. The lower spring seat 24 is secured to the housing 30.

During normal driving, the spring 10 compresses and relaxes, and the piston rod 28 of the damper 26 extends from and retracts into the housing 30. Care must be taken that, during especially rough driving condition, that the coils of the spring 10 not come in contact with one another. This is commonly referred to by those skilled in the art as the spring "going solid". If a spring goes solid, a rigid link is formed momentarily, and the vehicle ride is substantially deteriorated. However, in a modern vehicle, the overall length of the spring 10 is also severely constrained, because only a limited amount of space is available to mount the entire suspension assembly. Accordingly, it is desirable that the length of the spring 10 be as short as possible, consistent with the maintenance of proper riding and shock absorption qualities. Referring to FIG. 3, because the coil 20 has a diameter substantially less than the diameters of the adjacent intermediate coils 16 and 18, the coil 20 may nest within these coils when the spring fully compressed as illustrated in FIG. 3. Accordingly, a spring of a smaller overall length as compared to prior art spring may be provided, and the spring is able to compress to a larger degree as compared to prior art springs without the spring going solid because the smaller diameter coil 20 nest within the larger coils 16 and 18.

Figure 4:
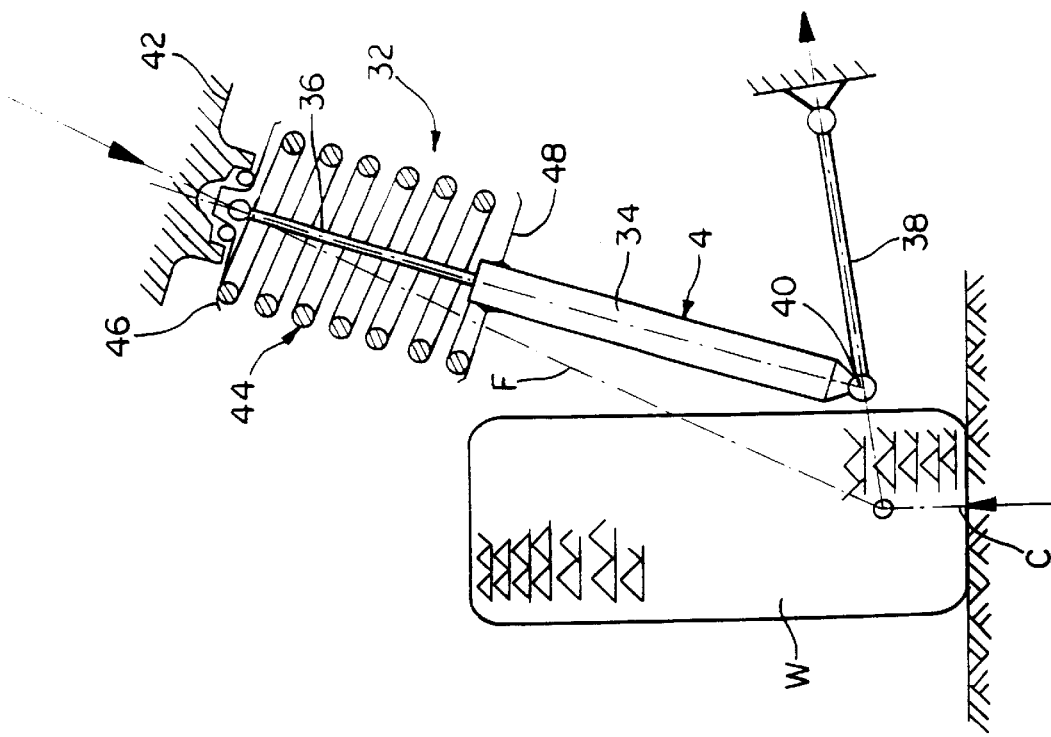

Referring now to FIG. 4, a typical prior art vehicle suspension system is illustrated schematically. The system includes a strut assembly generally indicated by the numeral 32, consisting of a suspension damper including a housing 34 and a piston rod 36 which extends from and retracts into the housing 34. The end of the housing 34 opposite the end from which the piston 36 extends is typically secured to the lower control arm 38 of the vehicle at a pivot connection 40. The upper end of the piston rod 36 is secured to the body 42 of the vehicle. A suspension spring of substantially constant diameter, generally indicated by the numeral 44, circumscribes the suspension damper and is compressed between an upper spring seat 46, which is secured to the body 42, and a lower spring seat 48, which is secured to the housing 34.

Figure 5:
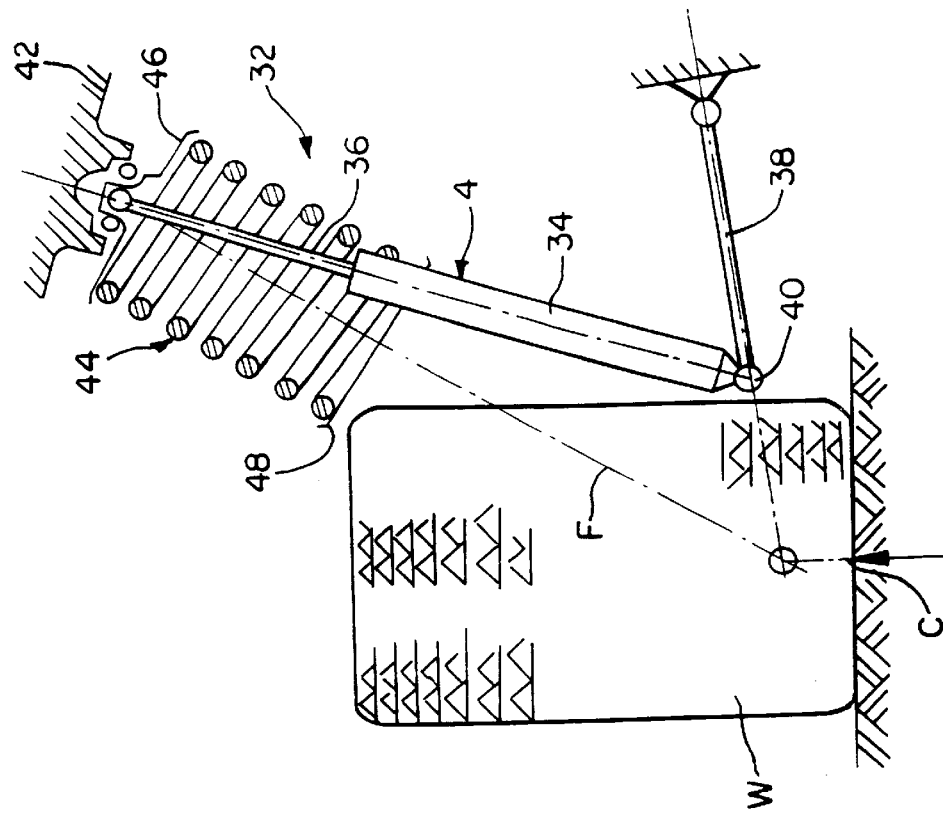
FIGS. 4 and 5 are schematic illustrations of prior art suspension systems of a type similar to that in which the springs of present invention may be used.

As illustrated in FIG. 4, the axis of the spring and the axis of the damper are the same. However, the spring 44 is most effective in absorbing road shocks if the axis of the spring acts along the line F through which forces exerted on the wheel W are transferred to the body 42 of the vehicle. The line F extends through the center C of the wheel W. Since it is impossible to move the pivot point 40 to the center of the tire, prior art attempts at improving ride have tilted the spring 44 such that the center line of the spring is along the line F, as illustrated in FIG. 5. However, this solution has obvious problems. As illustrated in FIG. 5, in the case of wider tires common in today's vehicles, there is insufficient clearance between the edge of the tire and the lower spring seat 48. Furthermore, the housing 34 of the damper interferes with the coils of the spring 44. In either case, undesirable transverse forces, indicated by the letter A, are applied to the damper. Accordingly, ride quality deteriorates. As discussed in the above mentioned U.S. pat. No. 4,903,985, the transversely acting force A may be substantially reduced if a spring that bows or deflects along a curved center line is provided.

Figure 6:
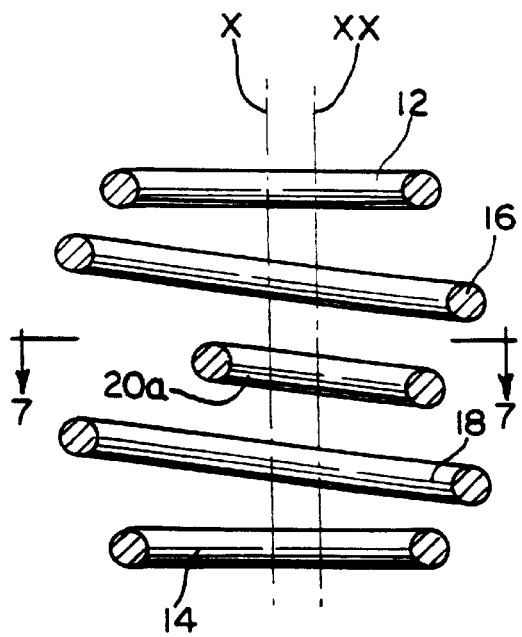
FIG. 6 is a view similar to FIG. 2, but illustrating a spring having variable coil diameters in which the axis of the smaller coil is offset from the axes of the larger coils.
Figure 7:
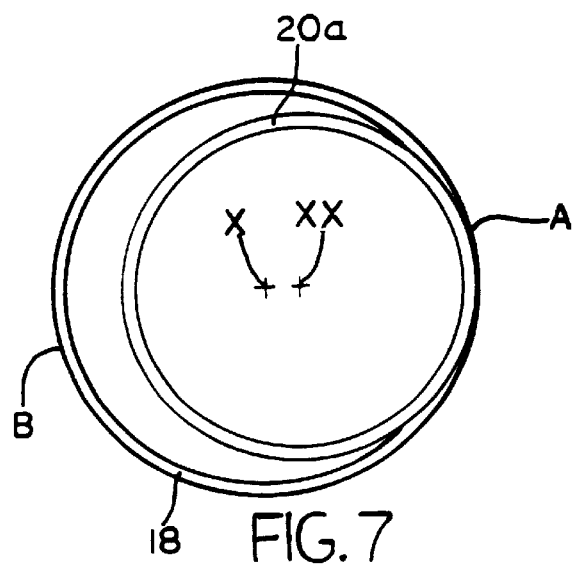
FIG. 7 is a cross-sectional view taken substantially along line 7—7 of FIG. 6.

Referring now to the embodiment of FIGS. 6—7, where elements the same or substantially the same as those in the embodiment of FIGS. 1—3 retain the same reference character, the small diameter coil 20a defines an axis xx that is offset from the axis x of the remaining coils. The offset of the smaller diameter of coil 20a, along with the reduced diameter, affects the local stiffness of the spring in that the side A of the spring is stiff and the opposite side B, from which the coil 20 is offset is softer. Accordingly when the spring is deflected, the softer side B of the spring compresses relatively more than the opposite stiffer side, and thus the spring bows or deflects along a curved center line. Accordingly, a moment is exerted on the lower spring seat 24 that opposes the force acting on the damper, thereby improving vehicle ride.

Figure 8:
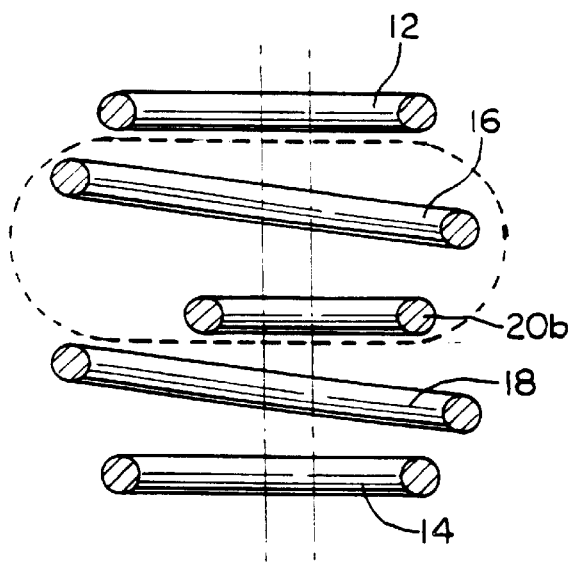
FIG. 8 is a view similar to FIGS. 2 and 6, but illustrating a spring in which the smaller coil is wound about an offset and has a pitch different from the other coils of the spring.

Each of the foregoing embodiments uses springs in which the intermediate coils have substantially the same pitch. Although the stiffness of a spring is unaffected by changes in pitch, the pitch of the coils of the spring does affect the load center of the spring, thus affecting the manner in which the spring collapses. Accordingly, it is possible, as illustrated in FIG. 8, to change the pitch of the smaller diameter intermediate coil 20 by an amount sufficient to permit the spring to compress along a substantially straight line instead of a curved line, since the change in pitch changes the load center of the spring an amount sufficient to overcome the change in deflection caused by the offset of the axes. Although the spring will compress along a substantially straight line, a moment is still applied to the lower spring seat 24 to counteract or resist the force acting transversely to the damper.

Figure 9:
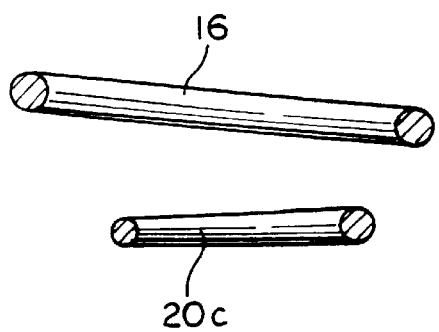
FIG. 9 is a view of the circumscribed portion of FIG. 8, but illustrating another embodiment of the invention in which the cross sectional area of one or more of the coils may be varied to vary the local stiffness of the spring.

The stiffness of a spring is also a function of the wire cross sectional area. As illustrated in FIG. 9, by the use of tapered wire, it is possible to wind a coil having a greater cross sectional area on one side of the spring and a smaller cross sectional area on the other side of the spring, as exemplified by the coil 20c in FIG. 9, thus causing a variation in the local stiffness of the spring having the same advantages as discussed above with respect to FIGS. 6–7.

The effects of the change in cross sectional area across a coil, offsetting a coil with respect to the remaining coils, and changing the pitch or wire diameter of the coils may all be combined to produce a spring with desired characteristics. Accordingly, a spring may be designed in which the transverse force applied to the damper is at least partially resisted, thereby improving driving and riding characteristics of the vehicle. Although the springs of the present invention have been disclosed with respect to their application in vehicle suspension systems, many other applications of springs according to the present invention outside of vehicle suspension systems are readily apparent.

What is claimed is:

1. Spring having an upper end coil, a lower end coil, and at least a pair of intermediate coils between said upper and lower end coils, one of said intermediate coils having a coil diameter less than the coil diameter of the other intermediate coil whereby the one intermediate coil is permitted to nest within the other intermediate coil upon compression of the spring, and wherein each coil of said spring extends around an axis, the axis of said one intermediate coil being offset from the axis of the other intermediate coil, the offset between the axis of the intermediate coils permitting said spring to compress along a curved center line as said spring is compressed.

2. Spring as claimed in claim 1, wherein the pitch of said one intermediate coil with respect to its axis differs from the pitch of the other intermediate coil with respect to its axis.

3. Spring as claimed in claim 1, wherein the pitch of each said intermediate coil with respect to said axes are substantially the same, the offset between the axes of the intermediate coils permitting said spring to compress along a curved center line as said spring is compressed.

4. Spring as claimed in claim 1, wherein the pitch of said one intermediate coil with respect to its corresponding axis is greater than the pitch of the other intermediate coil with respect its corresponding axis.

5. Spring as claimed in claim 4, wherein the pitch of said one intermediate coil with respect to its corresponding axis differs from the pitch of the other intermediate coil with respect its corresponding axis by an amount effective to permit the spring to compress along a substantially straight axis.

6. Spring as claimed in claim 4, wherein said coils are wound from an elongated material, the cross-sectional area of said elongated material varying so that at least one of said coils has regions of greater and lesser cross-sectional area.

7. Suspension assembly including an upper spring seat, a lower spring seat displaced from the upper spring seat, a suspension spring extending between said spring seats and urging the spring seats away from each other when the spring is compressed, said spring including an upper end coil engaging said upper spring seat, a lower end coil engaging the lower spring seat, and at least a pair of intermediate coils between said upper and lower end coils, one of said intermediate coils having a coil diameter less than the coil diameter of the other intermediate coil whereby the one intermediate coil is permitted to nest within the other intermediate coil upon compression of the spring, and wherein each coil of said spring extends around an axis, the axis of said one intermediate coil being offset from the axis of the other intermediate coil, the offset between the axes of the intermediate coils permitting said spring to compress along a curved center line as said spring is compressed.

8. Suspension assembly as claimed in claim 7, wherein the pitch of said one intermediate coil with respect to its corresponding axis differs from the pitch of the other intermediate coil with respect its corresponding axis.

9. Suspension assembly including an upper spring seat, a lower spring seat displaced from the upper spring seat, a suspension spring extending between said spring seats and urging the spring seats away from each other when the spring is compressed, said spring including an upper end coil engaging said upper spring seat, a lower end coil engaging the lower spring seat, and at least a pair of intermediate coils between said upper and lower end coils, one of said intermediate coils having a coil diameter less than the coil diameter of the other intermediate coil whereby the one intermediate coil is permitted to nest within the other intermediate coil upon compression of the spring, and wherein said assembly includes a suspension damper including a housing and a piston rod extending from said housing and extendible from and retractable into said housing, said piston rod extends through said upper spring seat, each coil of said spring extending around an axis, the axis of said one intermediate coil being offset from the axis of the other intermediate coil, the offset between the axes of the intermediate coils permitting said spring to compress along a curved center line as said spring is compressed to permit said spring to relieve transversely directed forces on said damper.

10. Suspension assembly including an upper spring seat, a lower spring seat displaced from the upper spring seat, a suspension spring extending between said spring seats and urging the spring seats away from each other when the spring is compressed, said spring including an upper end coil engaging said upper spring seat, a lower end coil engaging the lower spring seat, and at least a pair of intermediate coils between said upper and lower end coils, one of said intermediate coils having a coil diameter less than the coil diameter of the other intermediate coil whereby the one intermediate coil is permitted to nest within the other intermediate coil upon compression of the spring, and wherein said assembly includes a suspension damper including a housing and a piston rod extending from said housing and extendible from and retractable into said housing, said piston rod extending through said upper spring seat, each coil of said spring extending around an axis, the axis of said one intermediate coil being offset from the axis of the other intermediate coil, the offset between the axes of the intermediate coils, the pitch of said one intermediate coil with respect to its corresponding axis differing from the pitch of the other intermediate coil with respect its corresponding axis whereby said lower spring seat is urged in a direction relieving transversely directed forces on said damper.

11. Suspension assembly as claimed in claim 10, wherein said coils are wound from an elongated material, the cross-sectional area of said elongated material varying so that at least one of said coils has regions of greater and lesser cross-sectional area.

* * * * *